United States Patent
Duan et al.

(10) Patent No.: US 8,749,900 B2
(45) Date of Patent: Jun. 10, 2014

(54) LENS MODULE AND ELECTRONIC DEVICE USING THE SAME

(75) Inventors: Ju-Ping Duan, Shenzhen (CN); Ming-Fu Luo, Shenzhen (CN); Fa-Guang Shi, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 37 days.

(21) Appl. No.: 13/301,874

(22) Filed: Nov. 22, 2011

(65) Prior Publication Data

US 2013/0033769 A1 Feb. 7, 2013

(30) Foreign Application Priority Data

Aug. 5, 2011 (CN) .......................... 2011 1 0223581

(51) Int. Cl.
*G02B 7/02* (2006.01)
(52) U.S. Cl.
USPC ............................ 359/819; 359/811; 353/101
(58) Field of Classification Search
USPC ................. 359/811, 813, 818–820, 823, 827; 353/100, 101
See application file for complete search history.

(56) References Cited

U.S. PATENT DOCUMENTS

| | | | | |
|---|---|---|---|---|
| 4,697,890 A * | 10/1987 | Crookston et al. | ........ | 359/489.14 |
| 5,249,082 A * | 9/1993 | Newman | ........................ | 359/813 |
| 5,808,817 A * | 9/1998 | Miyamoto et al. | ............ | 359/819 |
| 6,400,516 B1 * | 6/2002 | Spinali | ........................... | 359/819 |
| 6,469,844 B1 * | 10/2002 | Iwase et al. | ..................... | 359/819 |
| 6,547,402 B2 * | 4/2003 | Masuda | ......................... | 353/101 |
| 7,180,688 B2 * | 2/2007 | Kikuchi | ......................... | 359/808 |
| 7,234,851 B2 * | 6/2007 | Goraguer | ...................... | 362/507 |
| 7,289,282 B2 * | 10/2007 | Matsushima | .................. | 359/819 |
| 7,815,478 B2 * | 10/2010 | Goraguer | ........................ | 445/22 |
| 2012/0105712 A1 * | 5/2012 | Terahara | ........................ | 348/360 |

* cited by examiner

*Primary Examiner* — Loha Ben
(74) *Attorney, Agent, or Firm* — Novak Druce Connolly Bove + Quigg LLP

(57) ABSTRACT

An electronic device using a lens module is disclosed. The lens module for a housing, comprises a barrel comprising a containing portion; and at least one lens insert molded mounted in the containing portion; wherein the containing portion comprises an inner sidewall, and a first latching portion in the inner sidewall; the at least one lens comprises a main body, and a second latching portion extends outward from a side surface of the main body; the second latching portion is received in the first latching portion.

15 Claims, 4 Drawing Sheets

LENS MODULE AND ELECTRONIC DEVICE USING THE SAME

BACKGROUND

1. Technical Field

The present disclosure relates generally to lens modules and, particularly, to an electronic device using the lens module.

2. Description of Related Art

Generally, electronic device, such as a tablet personal computer or a mobile phone, may include a housing and a lens module engaged in the housing. The lens module may include a barrel and at least one lens mounted in the barrel. The housing may define a through hole for exposing the lens, so that the housing may not shade the lens. However, some gaps may exist between the housing and the lens module or between the lens and the barrel, thus dusts may enter the gap, and thereby affecting the performance of the electronic device. In addition, the lens may be fixed in the barrel by an adhesive tape; but the unevenness of the adhesive force or the uneven thickness of the adhesive tape may both affect the performance of the lens module.

Therefore, there is room for improvement within the art.

BRIEF DESCRIPTION OF THE DRAWINGS

The elements in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
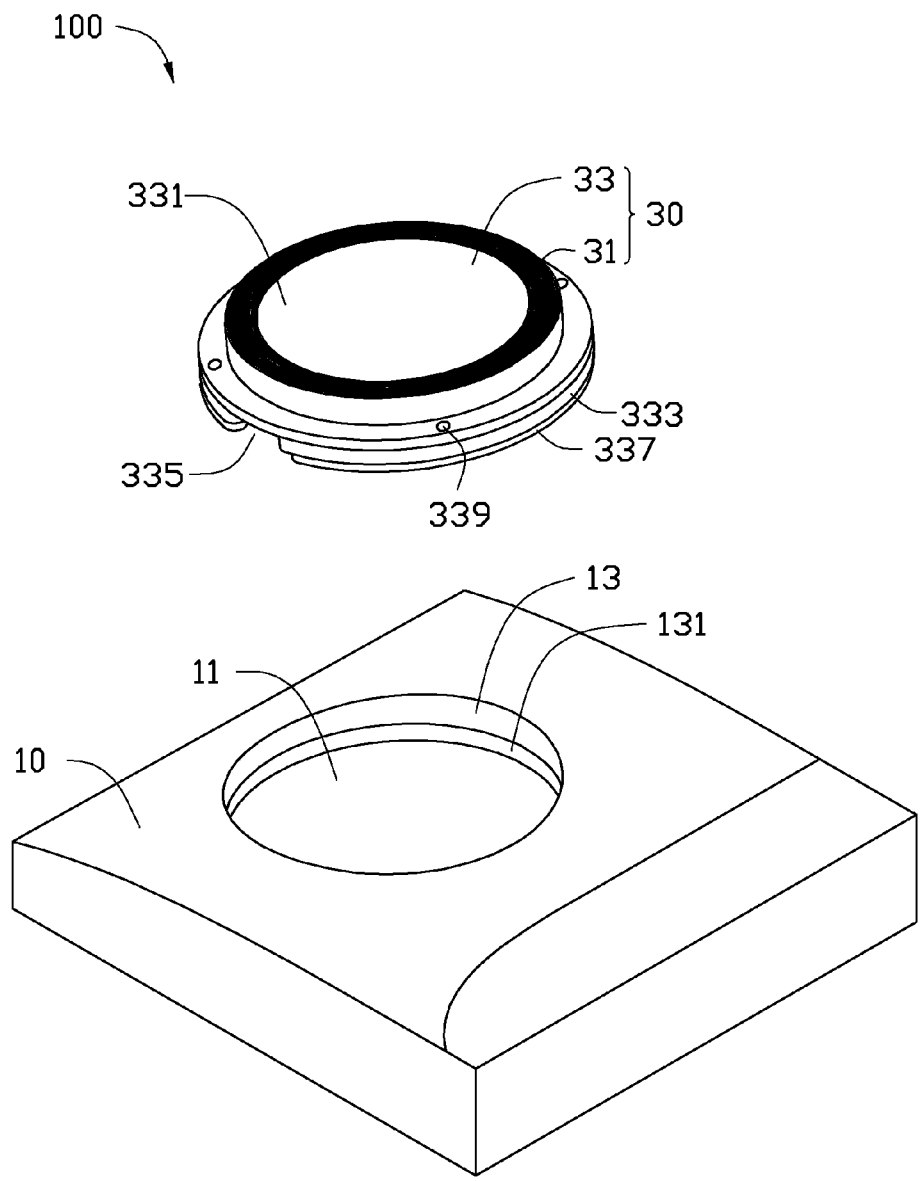
FIG. 1 is a partial, exploded isometric view of an embodiment of an electronic device including a housing, and a lens module having a lens and a barrel.

Referring to FIG. 1, an embodiment of an electronic device 100 comprises a housing 10 (only a part is shown), and a lens module 30 mounted in the housing 10. The housing 10 defines a through hole 11 for mounting the lens module 30. The through hole 11 comprises an inner sidewall 13. The housing 10 forms a first fixing portion 131 at the sidewall 13. In the illustrated embodiment, the fixing portion 131 is an annular depression defined in the sidewall 13 away from an outer surface of the housing 10. The lens module 30 comprises a barrel 31, and a lens 33 mounted in the barrel 31. The barrel 31 matches with the through hole 11 in dimensions, and is made of metallic material. In the illustrated embodiment, the electronic device 100 may be a mobile phone. The barrel 31 may be made of aluminum alloy.

Figure 2:
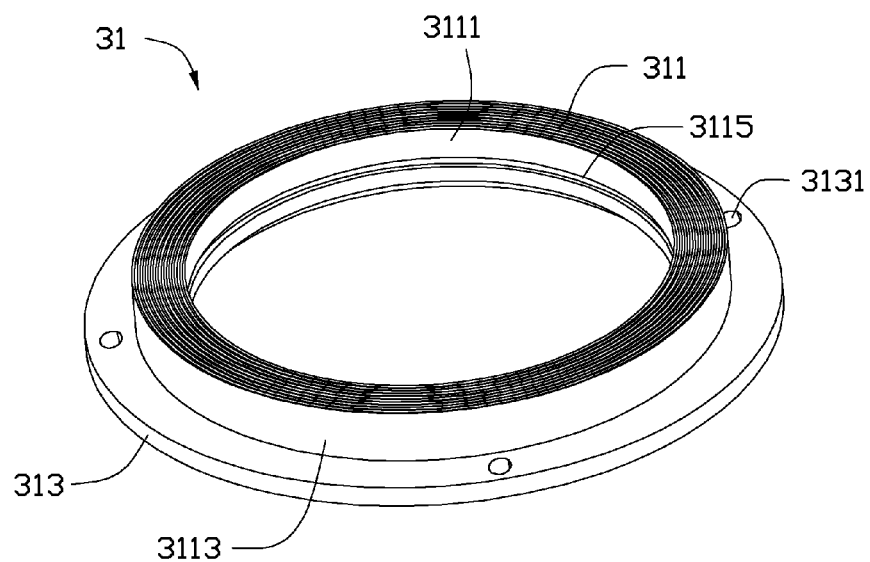
FIG. 2 is an enlarged, isometric view of the barrel of the lens module shown in FIG. 1.

Referring to FIG. 2, the barrel 31 comprises a containing portion 311, and a flange 313 extending outwardly from an end edge, along a radial direction of the containing portion 311. The containing portion 311 is substantially a hollow cylinder, and comprises an inner sidewall 3111 and an outer sidewall 3113. The inner sidewall 3111 defines a first latching portion 3115 at middle position of the inner sidewall 3111 to engage with the lens 33. The flange 313 defines a plurality of first locking portions 3131 along the peripheral of the flange 313. The plurality of first locking portions 3131 are spaced from each other, and extend through the flange 313. In the illustrated embodiment, the first latching portion 3115 is an annular groove. Each of the plurality of first locking portions 3131 is a circular through hole for the barrel 31 to latch with the lens 33.

Figure 3:
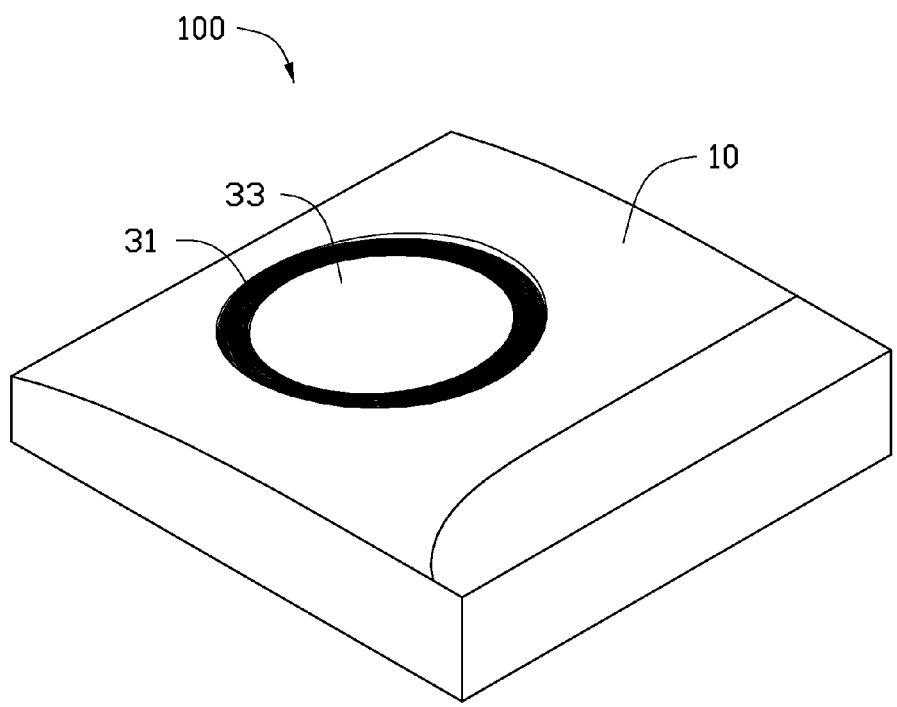
FIG. 3 is a partial, assembled, isometric view of the electronic device shown in FIG. 2.
Figure 4:
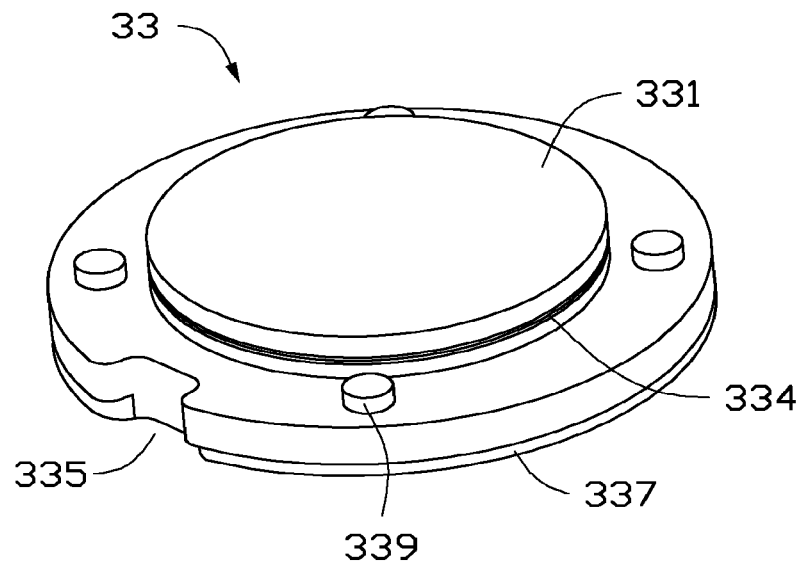
FIG. 4 is an isometric view of the lens of the lens module shown in FIG. 1.

Referring also to FIG. 3 and FIG. 4, the lens 33 may be made of resin materials or plastic materials. In the illustrated embodiment, the lens 33 may be made of acrylic. The lens 33 may be mounted in the barrel 31 by insert molding.

The lens 33 with the barrel 31 are assembled with the housing 10 by insert molding. The lens 33 is engaged in the containing portion 311 of the barrel 31 that is fixed to the housing 10. The lens 33 comprises a main body 331, an extending portion 333, a second latching portion 334, an identification portion 335, a second fixing portion 337, and a plurality of second locking portions 339. The main body 331 is a cylindrical body received in the containing portion 311. The extending portion 333 extends outwardly, along a radial direction of the body 331. The second latching portion 334 extends outward from a side surface of the main body 331, and is received in the first latching portion 3115 correspondingly. The second fixing portion 337 extends outwardly from a side surface of the extending portion 333 below the second latching portion 334. The second fixing portion 337 is received in the first fixing portion 131 of the housing 10 correspondingly. The second fixing portion 337 is locked with the first fixing portions 131. The identification portion 335 is a cutout defined in the extending portion 333 for identifying a direction of the lens module 30 to the housing 10 during assembly. The plurality of second locking portions 339 are posts formed on the extending portion 333, and are fixed in the plurality of first locking portions 3131 correspondingly. In the illustrated embodiment, the second latching portion 334 is an annular protrusion, and received in the first latching portion 3115, and the second fixing portion 337 is an annular protrusion, and received in the first fixing portion 131.

During assembling, a mold (not shown) may be provided. The mold may comprise a mold core (not shown), and the mold core may form a protruding portion (not shown) for forming the identification portion 335 of the lens. First, the barrel 31 is inserted to the through hole 11 of the housing 10, and the outer sidewall 3113 of the barrel 31 is abutted against the inner sidewall 13 of the housing 10. The housing 10 with the barrel 31 is placed into the mold core, and then molten acrylic material is injected into the mould for forming the lens 33. Second, the mold may be opened. Third, the mold may be cooled down. At this time, the lens 33, the barrel 31, and the housing 10 are combined together to form the electronic device 100.

Because the lens 33 of the lens module 30 was inserted into the barrel 31 by insert molding, the lens 33 can be evenly formed. The performance of the lens may not be affected by the molding processing. The lens 33 is tightly connected with the barrel 31 and the housing 10. Therefore, dusts may not enter the lens module, and a lifetime of the lens module 30 may be increased. Furthermore, since each of the plurality of first locking portions 3131 is locked with each of the plurality of second locking portions 339, rotating of the lens 33 in the barrel 31 may be avoided. Finally, processes of assembling the lens 33 may be omitted.

It is noted that the first latching portion 3115 can be other shapes, such as a protrusion, or a serration. Accordingly, a shape of the second latching portion 334 can be a corresponding groove, or a corresponding serration. The first fixing portion 131 can be other shapes, such as a protrusion, or a serration. Accordingly, a shape of the second fixing portion 337 can be a corresponding groove, or a corresponding serration. Each of the plurality of first locking portions 3131 can be other shape, such as a protrusion, or a serration. Accordingly, a shape of each of the second locking portions 339 can be a corresponding groove, or a corresponding serration. The identification portion 335 can be other shapes, such as a protrusion.

In other embodiments, the plurality of first locking portions 3131 or the first latching portion 3115 can be omitted. The housing 10 and the barrel 31 can be integrated together, thus the first fixing portion 131 can be omitted. Alternatively, the barrel 31 can be fixed in the housing by an adhesive tape after the lens 33 is inserted in the barrel 31, thus the first fixing portion 131 can be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A lens module for a housing, comprising:
   a barrel comprising a containing portion; and
   at least one lens mounted in the containing portion by insert molding;
   wherein: the containing portion comprises an inner sidewall, and a first latching portion in the inner sidewall; and the at least one lens comprises a main body, an extending portion extending outwardly along a radial direction of the main body, a second latching portion received in the first latching portion and extending outwardly from a side surface of the main body, and an identification portion which is a cutout defined in the extending portion.

2. The lens module of claim 1, wherein the first latching portion is an annular groove, and the second latching portion is an annular protrusion corresponding to a profile of the first latching portion.

3. The lens module of claim 1, wherein: the barrel further comprises a flange extending outwardly from an end edge along a radial direction of the containing portion; the flange defines a plurality of first locking portions arranged along a periphery of the flange; the at least one lens further comprises a plurality of second locking portions on the extending portion; and the plurality of second locking portions are configured to fix in the plurality of first locking portions correspondingly.

4. The lens module of claim 3, wherein each of the plurality of first locking portions is a through hole, and each of the plurality of second locking portion is a post.

5. A lens assembly of an electronic device, comprising:
   a housing defining a through hole; and
   a lens module mounted in the through hole of the housing, the lens module comprising at least one lens, and a barrel,
   wherein: the at least one lens is mounted in a containing portion of the barrel by insert molding; the containing portion comprises an inner sidewall, and a first latching portion in the inner sidewall; and the at least one lens comprises a main body, an extending portion extending outwardly along a radial direction of the main body, a second latching portion received in the first latching portion and extending outwardly from a side surface of the main body, and an identification portion which is a cutout defined in the extending portion.

6. The lens assembly of claim 5, wherein the first latching portion is an annular groove, and the second latching portion is an annular protrusion corresponding to a profile of the first latching portion.

7. The lens assembly of claim 5, wherein: the barrel further comprises a flange extending outwardly from an end edge along a radial direction of the containing portion; the flange defines a plurality of first locking portions arranged along a periphery of the flange; the at least one lens further comprises a plurality of second locking portions on the extending portion; and the plurality of second locking portions are configure to fix in the plurality of first locking portions correspondingly.

8. The lens assembly of claim 7, wherein each of the plurality of first locking portions is a through hole, and each of the plurality of second locking portions is a post.

9. The lens assembly of claim 5, wherein: the barrel comprises an outer sidewall; the through hole of the housing comprises an inner sidewall; the outer sidewall is abutted against the inner sidewall; and the outer sidewall and the inner sidewall are adhesively fixed together.

10. A lens assembly of an electronic device, comprising:
    a housing defining a through hole, the through hole comprising an inner sidewall;
    a lens module mounted in the through hole of the housing, comprising at least one lens and a barrel;
    wherein: the housing comprises a first fixing portion in the inner sidewall; the barrel comprises a containing portion; the containing portion forms another inner sidewall; the at least one lens is mounted in the containing portion by insert molding; the containing portion comprises a first latching portion formed in the another inner sidewall; the at least one lens comprises a main body, an extending portion, a second latching portion, and a second fixing portion; the extending portion extends from the main body along a radial direction of the main body outwardly; the second latching portion extends outwardly from a side surface of the main body; the second latching portion is received in the first latching portion; the second fixing portion extends outwardly from a side surface of the extending portion; and the second fixing portion is received in the first fixing portion.

11. The lens assembly of claim 10, wherein the first latching portion of the containing portion is an annular groove, and the second latching portion of the at least one lens is an annular protrusion corresponding to a profile of the first latching portion.

12. The lens assembly of claim 10, wherein the first fixing portion of the housing is an annular groove, and the second fixing portion of the lens module is an annular protrusion corresponding to a profile of the first fixing portion.

13. The lens assembly of claim 10, wherein the at least one lens further comprises an identification portion which is a cutout defined in the extending portion, and the identification portion is configured to identify a direction of the lens module in relation to the housing during assembly.

14. The lens assembly of claim 13, wherein: the barrel further comprises a flange extending outwardly from an outward end edge along the radial direction of the containing portion; the flange defines a plurality of first locking portions arranged along a periphery of the flange; the at least one lens comprises a plurality of second locking portions on the extending portion; and the plurality of second locking portions are fixed to the plurality of first locking portions.

15. The lens assembly of claim 14, wherein each of the plurality of first locking portions is a through hole, and each of the plurality of second locking portions is a post.

* * * * *